(12) United States Patent
Bernard

(10) Patent No.: US 7,040,794 B2
(45) Date of Patent: May 9, 2006

(54) PROGRAMMABLE MULTI-COLOR BACKLIGHT FOR A LIQUID CRYSTAL DISPLAY

(75) Inventor: Edwin I. Bernard, Sylmar, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 536 days.

(21) Appl. No.: 09/903,997

(22) Filed: Jul. 12, 2001

(65) Prior Publication Data

US 2003/0012035 A1    Jan. 16, 2003

(51) Int. Cl.
*F21V 7/04* (2006.01)

(52) U.S. Cl. ............ 362/555; 362/561; 362/27; 362/582; 362/26; 362/606; 362/607; 362/608

(58) Field of Classification Search ............ 362/555, 362/561, 27, 582, 583, 26, 31, 294, 800, 362/471, 606, 607, 608; 349/68; 359/267
See application file for complete search history.

(56) References Cited

U.S. PATENT DOCUMENTS 3,789,211 A * 1/1974 Kramer ............ 362/231
5,695,269 A * 12/1997 Lippmann et al. ............ 362/27
6,007,209 A * 12/1999 Pelka ............ 362/30
6,111,622 A * 8/2000 Abileah ............ 349/61
6,144,424 A * 11/2000 Okuda et al. ............ 349/65
6,231,200 B1 * 5/2001 Shinohara et al. ............ 362/31
6,288,700 B1 * 9/2001 Mori ............ 345/102
6,419,372 B1 * 7/2002 Shaw et al. ............ 362/231

* cited by examiner

*Primary Examiner*—Sandra O'Shea
*Assistant Examiner*—Bertrand Zeade

(57) ABSTRACT

A lighting apparatus for a liquid crystal display. The apparatus includes an array of light emitting diodes disposed alongside the liquid crystal display, which illuminate the display. Light pipes transmit the light from the light emitting diodes to the display, which light pipes span across a plane parallel with the liquid crystal display. A filter is disposed between the array and the light pipes for filtering out infra-red light from the light emitting diodes. This apparatus has special applications in the cockpit of an aircraft where the pilot is wearing infra-red light filtering goggles and needs to see outside the aircraft as well as read the instruments. The color of the light emitting diodes may be switched from red, to green to blue, depending upon the type of goggles the pilot is wearing.

13 Claims, 2 Drawing Sheets

PROGRAMMABLE MULTI-COLOR BACKLIGHT FOR A LIQUID CRYSTAL DISPLAY

BACKGROUND OF THE INVENTION

1. Field of the Invention

The present invention relates to an apparatus for providing selectable, multi-colored back-lighting for liquid crystal displays ("LCD's").

2. Description of Related Art

Liquid crystal materials emit no light of their own. They do however reflect and transmit light from external light sources.

Accordingly, it is necessary to back light the display, which is typically done with fluorescent lamps located either directly above or behind the LCD or on either side thereof. When illuminated from behind, a white diffusion sheet between the backlight and the LCD redirects and scatters the light evenly to ensure a uniform display. When light is transmitted through filters, layers of liquid crystal, electrode layers, polymer films, etc., more than eighty percent (80%) of the light is lost.

Moreover, in certain applications it is preferred to have back lighting for LCD's of only certain colors, such as in the cockpit of an aircraft, where red light is undesirable for use with night vision equipment. For clarification of the discussion below, the following definitions for Type I and Type II, Class A and Class B Night Vision Instrument Systems ("NVIS") lighting conditions are taken from the military specification document MIL-L-85762A, Section 1.3.

1.3 Classification. NVIS compatible aircraft interior lighting shall be of the following types and classes, as specified:

Type I Lighting compatible with and Direct View Image NVIS utilizing generation III Image intensifier tubes.

Type II Lighting compatible with any Projected Image NVIS utilizing generation III Image intensifier tubes.

Class A Lighting compatible with NVIS utilizing 625 nm minus blue objective lens filters.

Class B Lighting compatible with NVIS utilizing 665 nm minus blue object lens filters.

Assume for example that a pilot is wearing Type 1, Class A NVIS goggles, which are used for detecting infra red images in a limited-light or dark scenario. Now suppose internally reflected light or instrument panels of the aircraft comes within the field of view of the night vision goggles. If the displays are back lit with Class B filtered light, as is typically done for multicolor displays, then red light emissions at 665 nm wavelength emitted by the Class B displays will reduce the gain of the night vision goggles for a pilot wearing Type 1, Class A night vision goggles. The pilot's ability to use his Class A goggles to detect external IR images will be seriously impaired.

Type 1, Class A goggles are used for green monochrome displays and lighting. For such displays, no amount of red light emissions are acceptable, such as color displays having red as a part thereof. Hence, the liquid crystal display cannot be used in the multi-color mode. To overcome this problem, optical filters have been used but with a significantly lower light transmission compared to one that is used for a night vision multicolor display.

Type I, Class B night vision goggles are designed for use with multicolor displays where a limited amount of red spectrum is permitted, as per military specification MIL-L-85762A.

Class A goggles are designed to view external images at night at peak wavelength as low as 625 nm wavelength. In order for the display and cockpit lighting to be compatible with Class A goggles, the IR and red components must be completely removed with filtering, thereby rendering the display unsuitable for displaying red colored data at night.

To overcome the above-described problem, Class B goggles were designed for limited external use to wavelengths as low as 655 nm only. Hence, red data could safely be displayed because the Class B NVIS filters are designed to pass a limited amount of the red spectrum.

Today, LCD backlighting systems do not allow the display to be used for both Class A monochrome and Class B multicolor NVIS applications utilizing the same hardware. An NVIS optical filter can be designed for either Class A or Class B operation, but not both.

Therefore, a need exists for a display that can be switched from one color back lighting to another in order to adapt to a variety of situations or night vision systems.

SUMMARY OF THE INVENTION

The present invention provides the capability for viewing Type 1, Class B multi-color displays with Class B night vision goggles as well as viewing Type 1, Class A monochrome displays with Class A goggles by simply switching the backlight function on the display.

Moreover, the present invention obviates the need for special filters that would significantly lower the light transmission for multi-color displays.

These and other features, which will become apparent as the invention is described in detail below, are provided by a lighting apparatus for a liquid crystal display. The apparatus includes an array of light emitting diodes disposed alongside the liquid crystal display, which illuminate of the display. Light pipes transmit the light from the light emitting diodes to the display, which light pipes span across a plane parallel with the liquid crystal display. A filter is disposed between the array and the light pipes for filtering out infra-red light from the light emitting diodes. This apparatus has special applications in the cockpit of an aircraft where the pilot is wearing infra-red light filtering goggles and needs to see outside the aircraft as well as read the instruments. The color of the light emitting diodes may be switched from red, to green to blue, depending upon the type of goggles the pilot is wearing.

Still other features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

The general purpose of this invention, as well as a preferred mode of use, its objects and advantages will best be understood by reference to the following detailed description of an illustrative embodiment with reference to the accompanying drawings in which like reference numerals designate like parts throughout the figures thereof, and wherein.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a display that can be switched from one color back lighting to another in order to adapt to a variety of visual and display situations.

Figure 1:
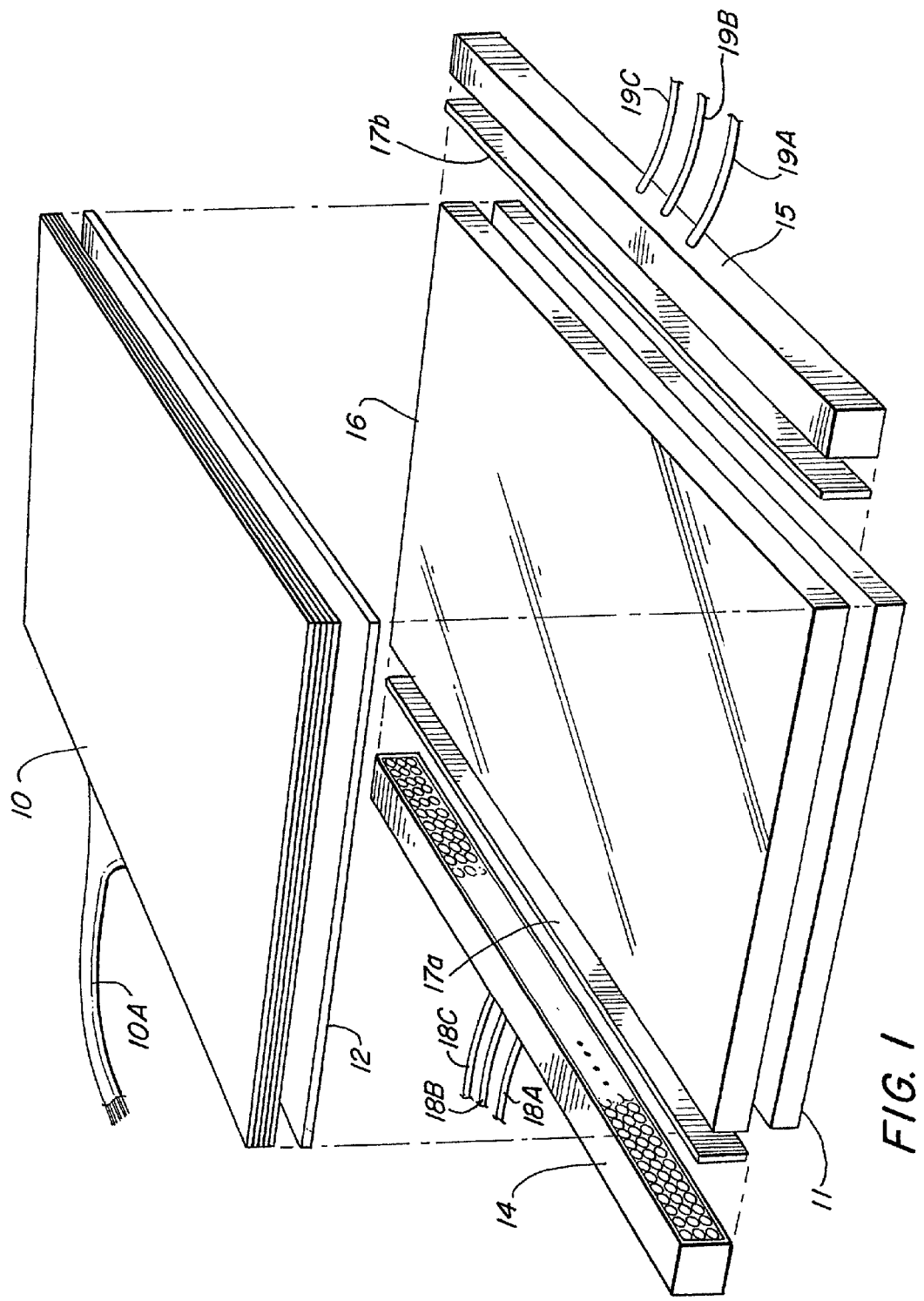
FIG. 1 illustrates a perspective view of the optical arrangement of the back lighting array of the present invention.

Referring now to the drawings and FIG. 1 in particular, a perspective view of the arrangement of the back lighting mechanism of the present invention is shown. A liquid crystal display ("LCD") 10 is illustrated above a day backlight assembly 11. Control signals are provided to the LCD 10 on cable 10A. A diffuser 12 is disposed just below the LCD 10 in order to create a uniform illumination surface for the LCD. These three components alone comprise a prior art LCD. The LCD 10 is made up of multiple layers, which is well known in the art and will not be described further herein.

In accordance with one embodiment of the present invention, a pair of linear arrays 14 and 15 of light emitting diodes ("LED's") are disposed on either side of a flat sheet of light pipes 16. Each of the arrays 14, 15 comprise individual rows of red, green and blue LED's, which are addressable in groups by color. Filter 17a is disposed between the LED array 14 and one edge of the sheet of light pipes 16; and, in a similar manner filter 17b is disposed between the LED array 15 and an opposite edge of the sheet of light pipes 16. The filters 17a and 17b are for use in filtering out infra-red light energy from the LED light sources, which will be explained further hereinafter. Cables 18a, 18b and 18c couple the LED array 14 to a source of power; and, in a similar manner cables 19a, 19b and 19c couple the LED array 15 to a source of power. The circuitry details are amplified hereinbelow.

Figure 2A:
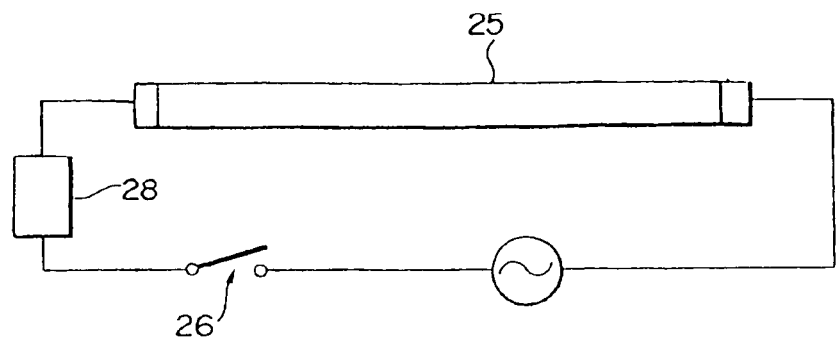
FIG. 2A is a schematic diagram of the circuit for the day back-light assembly.

The present invention solves the problems with the prior art liquid crystal displays by programming night vision back-lighting to be compatible for use with either Type 1, Class A monochrome LCD's or Type 1, Class B multicolor LCD's. This is accomplished by using a dual day and night back-light system. The day back-lighting is accomplished by use of conventional fluorescent lights electrically coupled in accordance with the schematic shown in FIG. 2A. Light 25 is turned on by closing a switch 26, which completes the circuit through a power source 27 and a starter 28. The sheet of light pipes 16 is transparent and the underlying fluorescent lights will accordingly transmit therethrough.

Figure 2B:
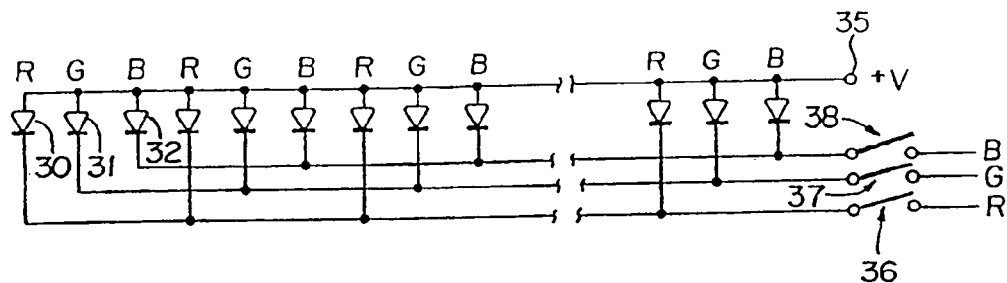
FIG. 2B is a schematic diagram of the circuit for the light emitting diodes used in accordance with the present invention.

Night back-lighting is accomplished by first turning off the fluorescent light and turning on the addressable arrays 14, 15 of light emitting diodes coupled as shown in the schematic diagram of FIG. 2B. The anodes of LED's 30, 31 and 32 are coupled to a source of positive voltage 35, and the cathodes thereof are coupled to one side of switches 36, 37 and 38, respectively. The remaining LED's of the arrays are coupled in a similar manner. For operation in the night mode to meet the Type 1, Class B full color radiance requirement the red, green and blue LED's are addressed together by closing all three switches 36, 37 and 38. This will produce a white color, but without the infra red components. For the Type 1, Class A monochrome radiance requirement, only the green LED's are addressed by closing only the switch 37. The NVIS filter is of course designed to meet the Type 1, Class B requirement for multicolor displays, which does allow a small portion of red through as mentioned earlier when there is a need for color data and Type I, Class B night vision goggle use.

While the invention has been particularly shown and described with reference to a preferred embodiment, it will be understood by those skilled in the art that various changes in form and detail may be made therein without departing from the spirit and scope of the invention.

Figure 3:
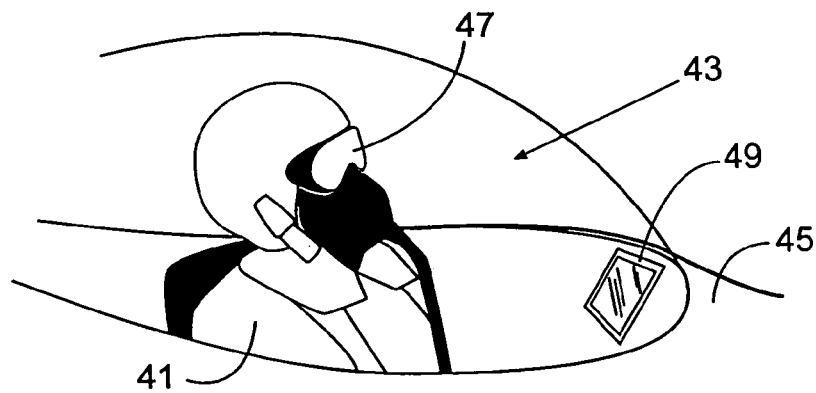
FIG. 3 is a schematic view of a cockpit of an aircraft.

In FIG. 3, a pilot 41 in a cockpit 43 of an aircraft 45 is wearing infra-red light filtering goggles 47 and needs to see outside the aircraft 45 as well as read the instrument 49. The color of the light emitting diodes (see FIG. 1) of the instrument 49 may be switched from red, to green to blue, depending upon the type of goggles 47 the person 41 is wearing.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. An improved lighting apparatus for backlighting a liquid crystal display, the lighting apparatus comprising:
    a. one or more light emitting diode arrays disposed on a plane perpendicular to the plane of the liquid crystal display, each light emitting diode array having a plurality of different groups of like colored light emitting diodes, each light emitting diode array including both red and non-red light emitting diodes;
    b. a switch coupled to the light emitting diode arrays in such a manner that the switch is operable to cause the red light emitting diode to switch on or off without causing the non-red light emitting diodes to switch on or off;
    c. light pipes parallel to the plane of the liquid crystal display for transmitting light from said light emitting diode arrays into the plane of said liquid crystal display for providing illumination thereof; and
    d. filters disposed between the arrays and the light pipes for filtering out infra-red light from the light emitting diodes.

2. The lighting apparatus of claim 1 wherein each light emitting diode array includes different groups of like colored diodes, each group emitting only red green or blue light, and each group emitting a different colored light than any other of the different groups of the light emitting diode array.

3. The improved lighting apparatus of claim 1 wherein the filters are adapted for NVIS-B goggles letting a small amount of red light through.

4. The improved lighting apparatus of claim 1 wherein the switch is coupled to the light emitting diode arrays in such a manner that the switch is also operable to cause a group of the non-red light emitting diodes that emit blue or green light to switch on or off.

5. A method for illuminating a liquid crystal display for viewing by a person wearing NVIS-A or NVIS-B night-vision goggles, the steps of the method comprising:
   a. activating an array of light emitting diodes having a plurality of different groups of like colored light emitting diodes adjacent the liquid crystal display;
   b. transmitting light from the light emitting diode array into the plane of the liquid crystal display to illuminate the liquid crystal display;
   c. filtering infra-red light emitted by the array of light emitting diodes before it is transmitted to the liquid crystal display; and,
   d. selectively switching on a first group of like colored light emitting diodes in the array but not all the light emitting diodes in the array if the person is wearing NVIS-A night vision goggles and selectively switching on a second group of like colored light emitting diodes in the array or switching on all the light emitting diodes in the array if the person is wearing NVIS-B night vision goggles.

6. The method of claim 5 wherein switching on a first group of like colored light emitting diodes consists essentially of switching on only green light emitting diodes or only blue light emitting diodes.

7. The method of claim 5 wherein the filtering step further comprises letting a small amount of red light through.

8. The method of claim 5 wherein in the selectively switching step, if NVIS-B goggles are worn by the person, all the light emitting diodes in the array are switched on.

9. An improved lighting apparatus for backlighting a liquid crystal display that may be viewed by a person wearing NVIS-A or NVIS-B night vision goggles, the lighting apparatus comprising:
   a light emitting diode array having a plurality of different groups of like colored light emitting diodes disposed to back-light the liquid crystal display, the light emitting diode array comprising red light emitting diodes and non-red light emitting diodes;
   a switch for addressing only the red light emitting diodes of the light emitting diode array;
   a sheet of light pipes; and
   a filter disposed between the light emitting diode array and the light pipes for filtering out infra-red light from the light emitting diodes.

10. The apparatus of claim 9 wherein the light emitting diode array comprises blue and green light emitting diodes, and the apparatus further comprises a switch for addressing only the blue light emitting diodes and a switch for addressing only the green light emitting diodes.

11. The apparatus of claim 10 wherein the apparatus further comprises a fluorescent light source positioned to transmit light through the sheet of light pipes, the fluorescent light source being positioned and oriented to emit light into the sheet through a side of the sheet other than a side of the sheet into which the array of light emitting diodes emits light.

12. The apparatus of claim 11 wherein the apparatus comprises at least two light emitting diode arrays, each diode array having a plurality of different groups of like colored light emitting diodes disposed to back-light the liquid crystal display, wherein the at least two diode arrays are positioned adjacent to different sides of the sheet of light pipes.

13. The apparatus of claim 12 wherein the light pipes are part of a sheet of light pipes, and the apparatus further comprises a fluorescent light source positioned to transmit light through the sheet of light pipes, the fluorescent light source being positioned and oriented to emit light into the sheet through a side of the sheet other than the sides of the sheet into which the arrays of light emitting diodes emits light.

* * * * *